Sept. 30, 1941.   G. T. REICH   2,257,533
APPARATUS FOR THE TREATMENT OF GASES
Filed March 22, 1939   4 Sheets-Sheet 1

Inventor:
Gustave T. Reich
By Potter, Pierce & Scheffler
Attorneys.

Sept. 30, 1941.     G. T. REICH     2,257,533
APPARATUS FOR THE TREATMENT OF GASES
Filed March 22, 1939     4 Sheets-Sheet 3
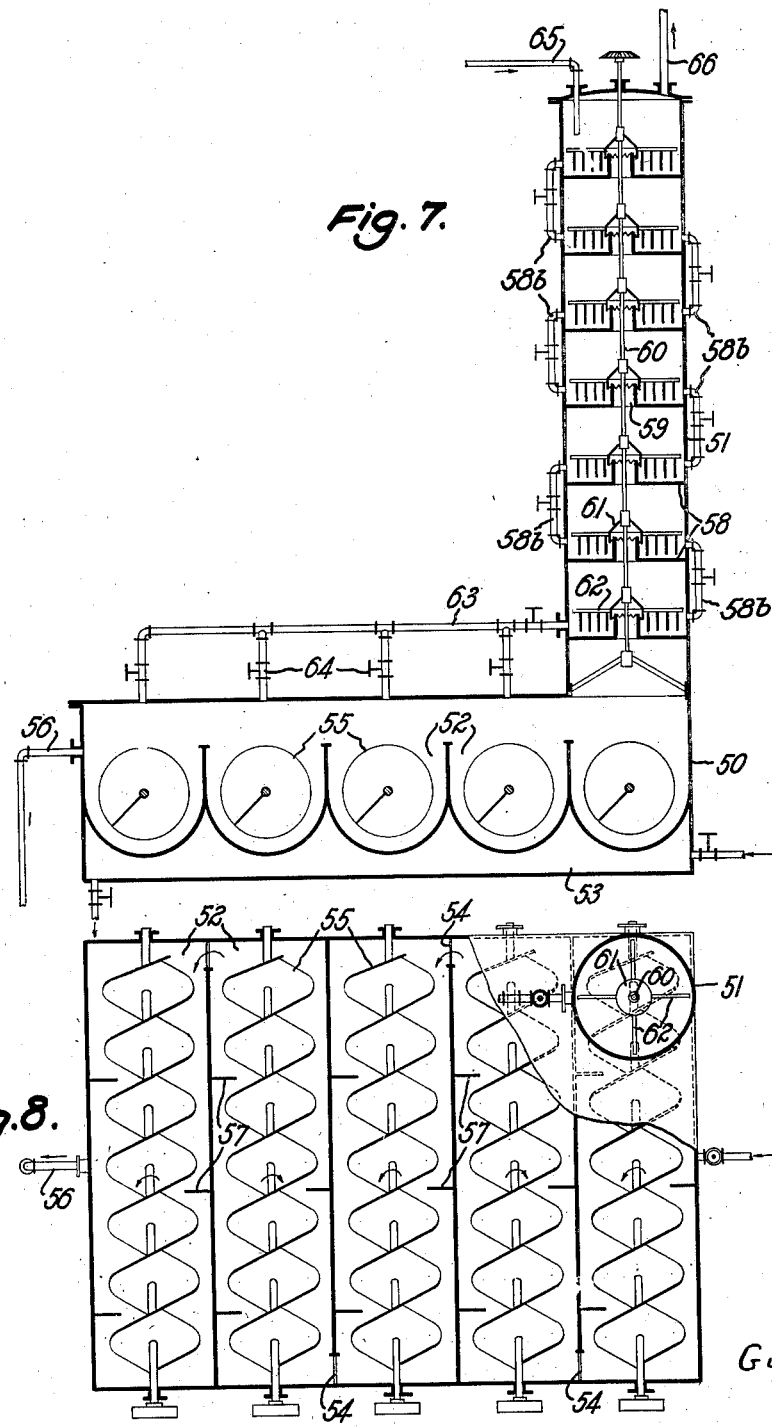

Sept. 30, 1941.   G. T. REICH   2,257,533
APPARATUS FOR THE TREATMENT OF GASES
Filed March 22, 1939   4 Sheets-Sheet 4
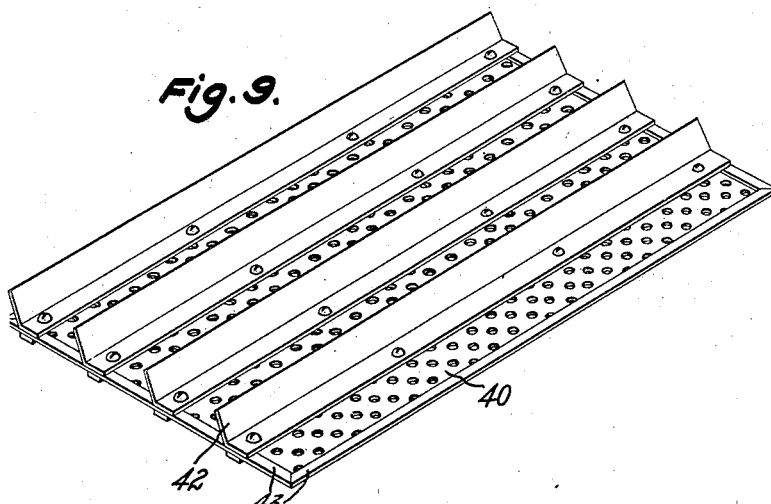
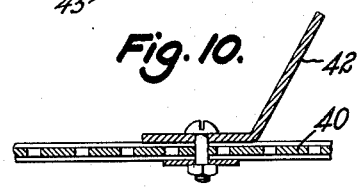
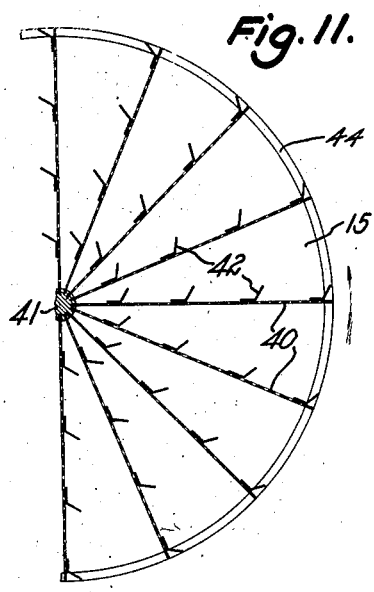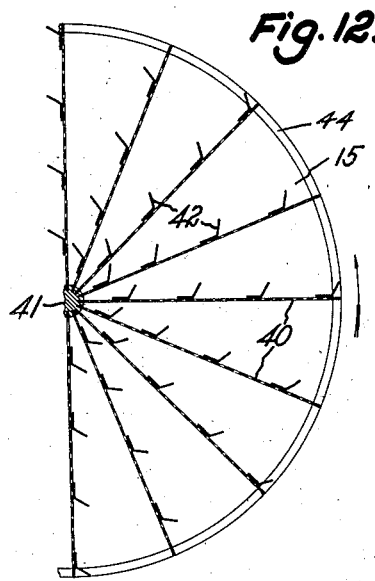
Inventor:
Gustave T. Reich
By Potter, Pierce & Schaffler
Attorneys.

Patented Sept. 30, 1941

2,257,533

UNITED STATES PATENT OFFICE 2,257,533

APPARATUS FOR THE TREATMENT OF GASES

Gustave T. Reich, Philadelphia, Pa.

Application March 22, 1939, Serial No. 263,515

9 Claims. (Cl. 23—283)

This invention relates to apparatus for the treatment of gases and is particularly directed to apparatus suitable for the production, handling and dissociation of suspensions of alkali bicarbonates in the production of carbon dioxide from gases by absorbing the carbon dioxide in alkali carbonate solutions and dissociating the alkali bicarbonate thus formed by heat.

I have found that carbon dioxide may be recovered very efficiently from gases containing this substance, even in relatively low concentrations, by absorbing the carbon dioxide in an alkali carbonate solution until a suspension of alkali bicarbonate is formed and thereafter thermally dissociating the alkali bicarbonate with the evolution of carbon dioxide by heating the suspension either as formed or after further thickening. Various methods of procedure are described in my copending applications Serial Number 190,859, filed February 16, 1938, and Serial Number 219,444, filed July 15, 1938, and in my U. S. Patent Number 2,142,917.

However, the absorption of carbon dioxide from gas mixtures of relatively low carbon dioxide content has always been quite incomplete with the apparatus heretofore used. Moreover, certain mechanical difficulties are encountered in the handling and treatment of such alkali bicarbonate suspensions, and I have found that in order to obtain the most economical and efficient operation of methods of carbon dioxide recovery involving the treatment of such suspensions, novel forms of apparatus must be utilized and the apparatus which I have invented to increase the efficiency of absorption of carbon dioxide in alkali carbonate solution and the efficiency of thermal dissociation of alkali bicarbonates and to overcome the difficulties met in the industrial application of the methods described above, forms the subject-matter of the present application.

A principal object of the invention, therefore, is the provision of apparatus suitable for the production, handling and treatment of slurries and suspensions, particularly suspensions of alkali bicarbonate.

Another object of the invention is the provision of efficient means for the absorption of carbon dioxide in alkali carbonate solutions.

A further object is the provision of suitable apparatus for the thermal dissociation of alkali bicarbonate.

Another object of the invention is the provision of apparatus for effecting intimate contact of gases and liquids.

Other objects and advantages of the invention will be apparent from the following detailed description of illustrative embodiments of the invention with particular reference to the accompanying drawings in which:

Fig. 7 is a diagrammatic representation of a thermal dissociator embodying the principles of the invention;

Fig. 8 is a plan view in partial section of the dissociator of Fig. 7;

Fig. 9 is a perspective view of an agitator blade member;

Fig. 10 is a sectional detail of Fig. 9;

Fig. 11 is a diagrammatic representation of an agitator assembly; and

Fig. 12 is a diagrammatic representation of a modified agitator assembly.

Figure 1:
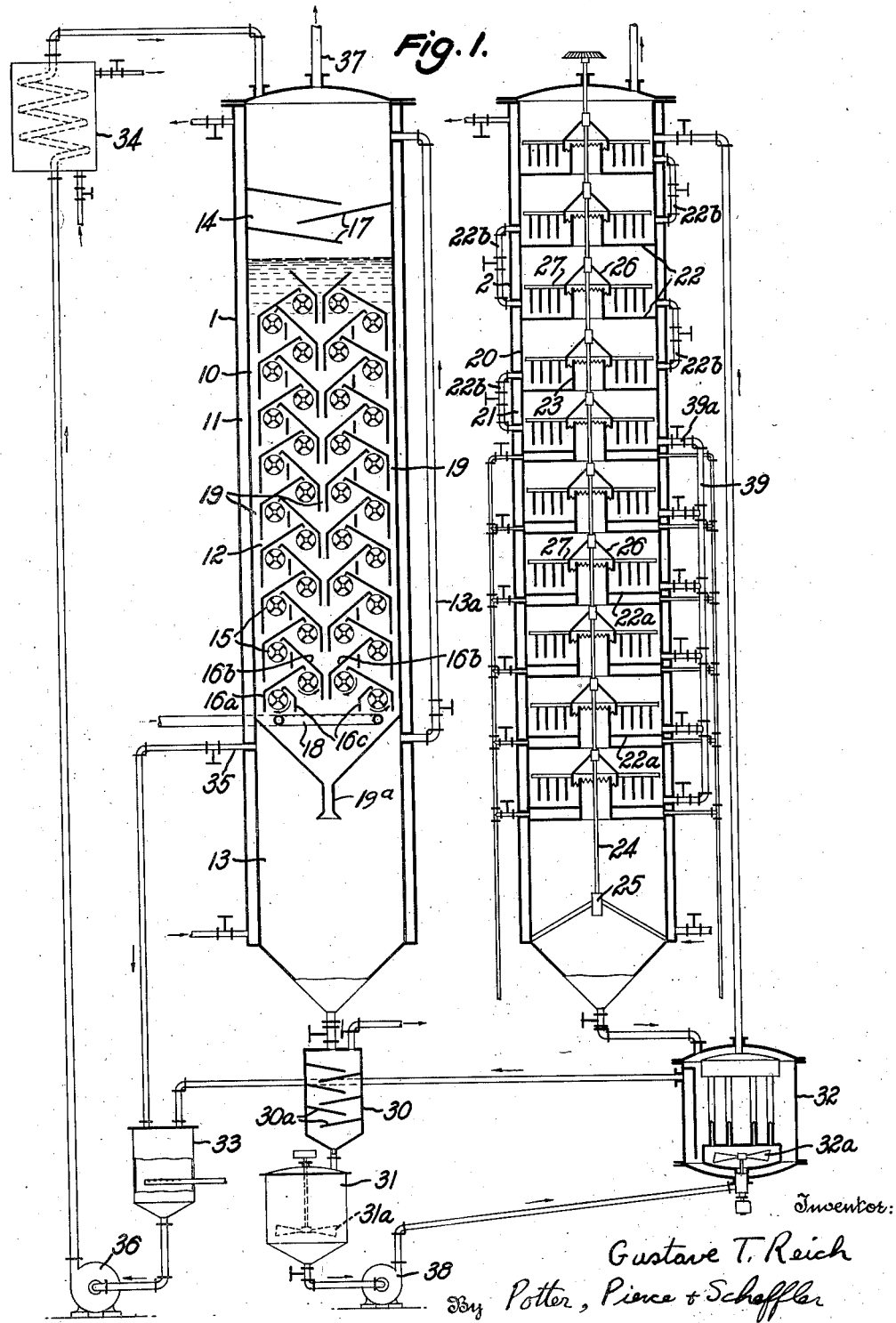
Fig. 1 is a diagrammatic representation of a system of apparatus suitable for the production of substantially pure carbon dioxide from gases containing the same.
Figure 2:
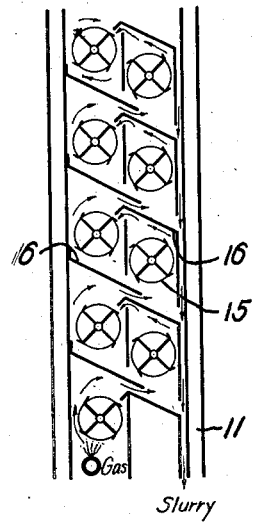
Figs. 2 to 6 are diagrammatic representations of various modifications in the form and arrangement of the elements of carbon dioxide absorbers embodying the principles of the invention.
Figure 4:
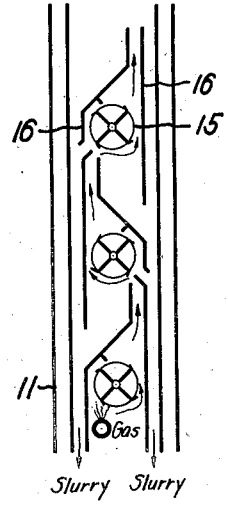
Figure 3:
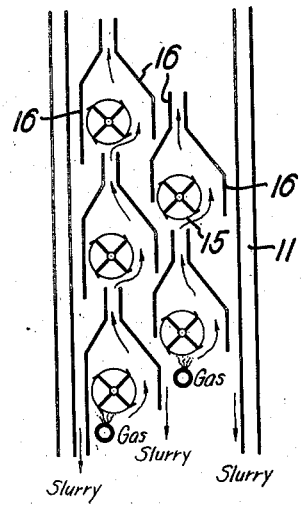
Figure 5:
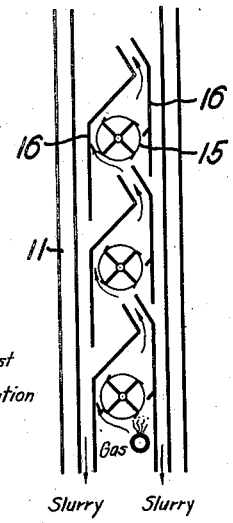
Figure 6:
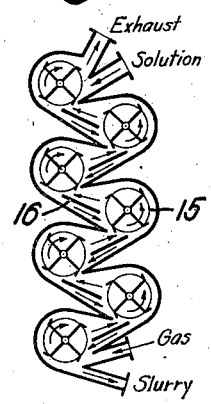

The principal elements of the apparatus shown in Fig. 1 are the absorber 1 and the dissociator 2.

Absorber 1 is a vertical shaft 10 advantageously rectangular in cross-section, provided with a jacket 11, and including an absorbing section 12, a settling section 13, and a separator section 14.

The absorbing section is provided with a plurality of agitators 15 rotatable on vertical shafts passing through stuffing boxes in the side of the absorber and connected to suitable driving means, and baffle members 16a, 16b, 16c providing a plurality of tortuous paths from the lower to the higher agitator. The agitators are rotated in such a direction as to force gas bubbles meeting the agitator to take the longest possible path through the liquid in the absorber, as shown by the arrows.

The separator section is provided with baffle plates 17.

Dissociator 2, which also includes a scrubber section, comprises a vertical shaft 20, preferably of circular cross-section, provided with a jacket 21. Within the shaft are a plurality of horizontal annular plates 22, 22a. Plates 22a are hollow and steam connections are provided to jacket 21 and to hollow plates 22a. In the central opening of each of the plates 22, 22a is an upright cylindrical weir member 23 having a serrated upper edge. Rotatable vertical shaft 24 carried at its lower end in step bearing 25 passes through the central opening of each of the plates. Mounted on the shaft 24 above each of the plates is a cap 26, having a serrated lower edge, and a rake or plow 27.

Other elements of the apparatus assembly are deaerator 30, receiver 31, heat exchanger 32, mixer 33 and cooler 34.

In operation, the absorber 1 is filled to above the level of agitators 15 with an alkali carbonate solution, for example, a solution containing 8 to 25 pounds of sodium carbonate per cubic foot and saturated or nearly saturated with sodium bicarbonate. Flue gas is passed in through inlet 18 and in passing up through the tortuous path provided by baffles 16a, b, c, and agitators 15 under the vigorous agitation and beating of the agitators, a very extensive and constantly renewed gas-liquid interface is provided so that all but a very small proportion of the carbon dioxide content of the gas reacts with the sodium carbonate to form sodium bicarbonate which precipitates in solid form. The sodium bicarbonate precipitate works downward, principally through channels 19, to the bottom of the absorber section and thence through neck 19a into the settling section. Supernatant liquor is drawn off, preferably continuously, at 35, mixed in 33 with strong sodium carbonate solution from the dissociator, and the mixture is pumped by pump 36 through cooler 34 to the top of absorber 1. Any entrained gases which are released from the alkali bicarbonate suspension in the settling chamber may be returned to the top of the absorber through conduit 13a. Waste gas passes off at the upper end of the absorber through outlet 37. The temperature of the absorber may be regulated by passing water through jacket 11.

The concentrated slurry of solid bicarbonate in suspension which collects in the bottom of settling chamber 13 is drawn off through vessel 30, wherein entrapped air bubbles are released in passing over baffles 30a, into receiver 31 fitted with an agitator 31a to maintain the slurry in suspension. The slurry is then pumped by pump 38 through heat exchanger 32, equipped with agitator 32a, to the top of dissociator 2.

The upper four plates 22 of dissociator 2 constitute the scrubber section wherein the carbon dioxide released in the lower portion of the dissociator is cooled and freed of the major portion of its water content, while the alkali bicarbonate solution is progressively heated up to dissociation temperature in passing down through the plate sections. The slurry entering at the top of the scrubber flows from chamber to chamber until it reaches the dissociator. Carbon dioxide and water-vapors rise in counter-current to the slurry and carbon dioxide bubbles through the bubbling bonnets 26 which are preferably attached to the rotating shaft 24. The bubbling bonnets may be provided with slots, notches or other suitable dispersing means. The rate of the rotation of the shaft should be just sufficient so as to keep the precipitated alkali bicarbonate present in the slurry in suspension. Therefore, stirring arms 21 are attached either directly to the bubbling bonnets or by other means to the rotating shaft. The agitators may be prongs, arranged like a rake, or other scraping devices effective to keep the precipitate in suspension. The bubbling bonnet which is preferably fastened to the agitator so as to prevent the escape of the carbon dioxide before it gives up some of its heat and water, rotates with the agitator, acts as a distributor for the thick slurry, and maintains a back pressure upon the whole system. The bubbling bonnet has, preferably, a slanting dome, whereby the slurry passing from chamber to chamber falls first upon the slanting dome and is distributed evenly.

The slurry in the scrubber should not be heated above 65° C., in order not to cause dissociation of the alkali metal bicarbonate; otherwise the slurry may become so saturated with alkali metal carbonate at such a low temperature that crystallization will take place, thereby preventing an efficient recovery of carbon dioxide.

The dissociation of the alkali bicarbonate is effected in the lower section of the dissociator containing heated plates 22a. Conduits 39 with control valves 39a make it possible to pass slurry directly from any upper plate of this section to any lower plate to equalize the operation of the plates. Similar control of the upper plates is provided by conduits 22b. The rate of flow of the slurry and the supply of heat to the dissociator are adjusted so that the desired proportion of the alkali bicarbonate content of the slurry is dissociated. The dissociation may be carried to such an extent that a solution of alkali carbonate relatively free from bicarbonate is obtained at the bottom of the dissociator, or the conditions may be adjusted so that substantially only the solid portion of the alkali bicarbonate is dissociated, so that the solution returned to the absorber is saturated or nearly saturated with alkali bicarbonate.

The structural arrangement of the apparatus of the invention may be widely varied. For example, the absorption operation may be carried out in two successive absorbers. The first is fed, for example, with an alkali carbonate solution and absorbing from gases leaving the second absorber residual carbon dioxide contained therein and producing a solution substantially saturated with alkali bicarbonate. This solution is fed to the second absorber where it contacts fresh gas. The alkali bicarbonate produced is immediately precipitated and a suspension of solid bicarbonate is obtained.

Figs. 2 to 6 illustrate various arrangements of agitator members 15 and baffle members 16 in the absorber. All of the arrangements are characterized by providing a tortuous path for the upward passage of gas from one agitator beater to another, and a relatively straight and direct path for the settlement of slurry to the bottom of the absorber.

Figs. 11 and 12 illustrate two useful forms of agitators 15, the construction being shown in detail in Figs. 9 and 10. The agitators comprise a plurality of radial blades 40, preferably formed of perforated metal plates, mounted on a rotatable shaft 41. A plurality of angle members 42 are welded or bolted to the blades 40 and serve both to stiffen the blades and to catch and direct bubbles of carbon dioxide into the agitator blades. In Fig. 11 the members 42 are in the same relative position on each blade, while in Fig. 12 the members 42 are staggered from blade to blade.

The edges of the blades are advantageously stiffened by members 43 and the outer ends of the blades are maintained in proper spaced position by circular hoops 44 which may be welded or bolted to the blades.

The primary function of the agitators is to break up the incoming raw flue gas stream and keep it broken up during passage through the absorber and to break up the column of alkali absorbing liquid thus bringing every particle of flue gas and alkali liquor into intimate contact by the scrubbing action and thereby securing a very high absorption efficiency. The action of the agitators also accelerates the precipitation of the solid bicarbonate formed, by centrifugally throwing the bicarbonate crystals out of the violent agitation zone and washing them successively down the inclined baffle plates to the settling section or chamber.

A modified form of dissociator and scrubber is shown in Figs. 7 and 8. In this embodiment of the invention 50 is the dissociator section and 51 is the scrubber section. The dissociator comprises a plurality of longitudinal trough sections 52 opened at the top into a common gas space leading into the bottom of the scrubber. Heating means, such as a steam jacket 53, are provided for the dissociator troughs. The troughs are connected in series by openings 54 at alternate ends. Each trough is provided with a spiral agitator 55 pitched to move the contents of the trough toward the opening into the next succeeding trough. The last trough from the scrubber end is provided with an alkali carbonate lye outlet 56. Baffles 57 in the troughs prevent the slurry from passing too directly from the inlet to the outlet.

Instead of having a common vapor space as shown, the vapor spaces of the individual troughs may be separated and the evolved gas may be withdrawn therefrom separately or may pass through the individual vapor spaces in series. The troughs may also be superposed.

The scrubber section is similar to the scrubber of Fig. 1. It comprises a vertical cylindrical tower provided with a plurality of annular plates 58 having vertical wells 59 with notched upper edges at the central openings of the plates. Mounted on vertical shaft 60 are conical domes 61 with notched lower edges and agitator rakes 62.

In order to control the solid content of the slurry in the dissociator troughs 52 and to equalize the operation of the troughs, a by-pass conduit 63, with regulating valves 64, is provided, so that alkali bicarbonate slurry may be fed directly from the bottom plate of the scrubber to any desired trough.

Conduits 58b provide for the direct flow of slurry between successive plates of the scrubber and thus provide for regulation of the flow of liquid through the scrubber.

In operation, alkali bicarbonate slurry is fed to the top of the scrubber through conduit 65, and passes downward from plate to plate in intimate contact with the upward flowing carbon dioxide. The carbon dioxide is cooled and its water vapor content condensed, and the pure carbon dioxide passes out through outlet 66. The warm alkali bicarbonate slurry is fed from the last plate of the scrubber into the first trough of the dissociator, or in part directly into succeeding troughs. The slurry passes serially through the troughs wherein any desired proportion of the alkali bicarbonate may be dissociated by suitably regulating the rate of feed of the bicarbonate slurry and the heat supplied to jacket 53.

Many other variations in structure and arrangement of the elements of the invention will be apparent from the foregoing description to those skilled in the art.

I claim:

1. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, and means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids.

2. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids, and to intercept solids settling out of the liquid and guide said solids into said vertical passages.

3. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, and means so constructed and positioned around each agitator as to define a separate zone for each agitator and to guide the gas into said effective zone and comprising baffle members so constructed and positioned as to guide solids settling out of the liquid in uninterrupted substantially vertical passages provided by said baffle means outside the effective zone of said agitators.

4. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, and means so constructed and positioned around each agitator as to define a separate zone for each agitator and comprising baffle members cooperating with said casing to provide paths converging upwardly into the effective zone of the agitators and paths converging downwardly out of the effective zone of said agitators into uninterrupted substantially vertical passages for the settling of solids.

5. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of vertically rotatable agitators positioned in said casing in the upward path of the gas, and means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids.

6. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of vertically rotatable agitators positioned in said casing in the upward path of the gas, said agitators comprising a plurality of perforate vanes radially affixed to a shaft horizontally positioned in said casing, and means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids.

7. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids, and a zone in the lower portion of said casing below the point of introduction of gas wherein precipitated solids may settle out of the liquid.

8. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids, a zone in the lower portion of said casing below the point of introduction of gas wherein precipitated solids may settle out of the liquid, and baffle members separating the agitated zone of the casing from the settling zone.

9. Apparatus for the treatment of gases with liquids with the formation of a solid precipitate which comprises a casing, means for circulating a liquid downwardly through said casing, means for passing a gas into said casing in the lower portion thereof, means providing intimate contact between the gas and the liquid comprising a plurality of rotatable agitators positioned in said casing in the upward path of the gas, means so constructed and positioned around each agitator as to define a separate zone for each agitator and to guide the gas into said effective zone and comprising baffle members so constructed and positioned as to provide uninterrupted substantially vertical passages outside the effective zone of said agitators for the settling of solids, and baffle members positioned in the upper portion of the casing above the liquid level to eliminate entrained liquid from the gas.

GUSTAVE T. REICH.